Jan. 19, 1954     H. J. TRURNIT     2,666,355
METHOD OF STUDYING CHEMICAL REACTIONS BY
MEASURING INTERFACIAL FILM THICKNESSES
Filed Oct. 12, 1951     2 Sheets-Sheet 1
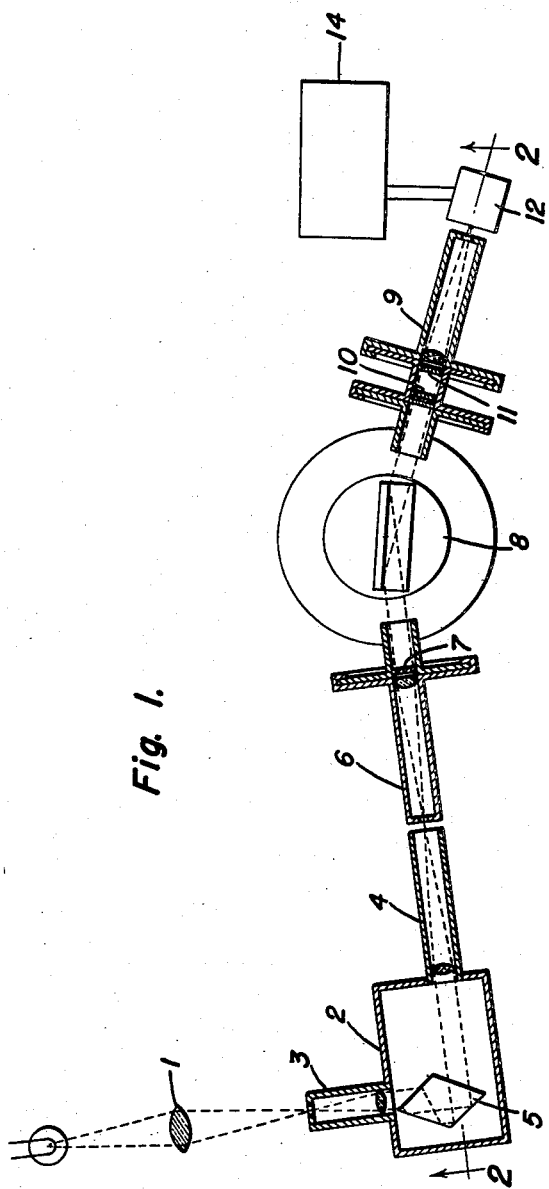
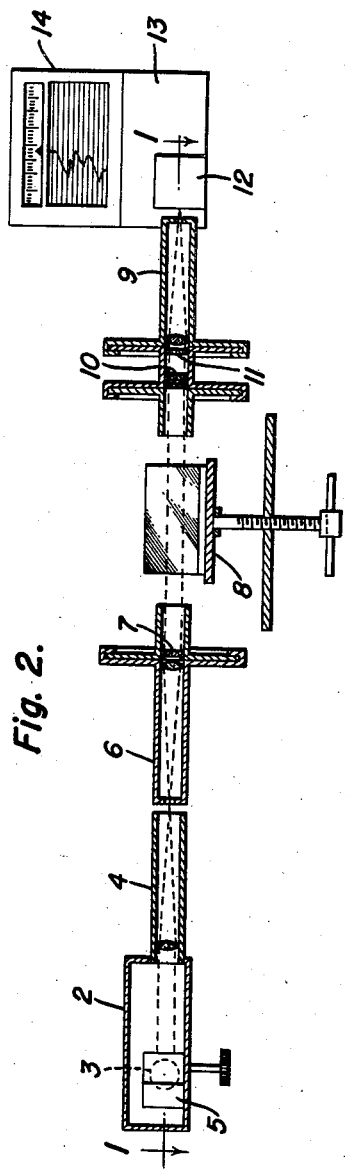
INVENTOR.
Hans J. Trurnit
BY
ATTORNEY Jan. 19, 1954    H. J. TRURNIT    2,666,355
METHOD OF STUDYING CHEMICAL REACTIONS BY
MEASURING INTERFACIAL FILM THICKNESSES
Filed Oct. 12, 1951    2 Sheets-Sheet 2

INVENTOR.
Hans J. Trurnit
BY
ATTORNEY

Patented Jan. 19, 1954

2,666,355

UNITED STATES PATENT OFFICE 2,666,355

METHOD OF STUDYING CHEMICAL REACTIONS BY MEASURING INTERFACIAL FILM THICKNESSES

Hans J. Trurnit, Edgewood, Md.

Application October 12, 1951, Serial No. 251,122

5 Claims. (Cl. 88—14)

(Granted under Title 35, U. S. Code (1952), sec. 266)

The invention described herein may be manufactured and used by or for the Government, for governmental purposes, without the payment to me of any royalty thereon.

The invention contained herein is directed to a method for studying the kinetics involved in surface reactions. More specifically, the invention is directed to a method of investigating a reaction system wherein one reactant is attached to a solid surface and a second reactant is present in the liquid or gas in contact therewith.

It has long been desirable to be able to study the chemical surface phenomena of interfacial reactions for it is believed that in this area the answers to many heretofore unsolved problems would be found. The study of interfacial reactions have, in the past, been undertaken from a disadvantageous position; for example, rates of such reactions have been studied by periodic analysis during a reaction by density, volume, or color investigations. Such methods are very difficult and require a large amount of interpolation for the intervening period between successive samples; in addition, such technique is ineffective when the reaction proceeds at a fast rate and equally ineffective when the reaction is a slow one, the former due to the difficulty of obtaining samples in the short period and the latter due to the long time that is required to record changes with these relatively insensitive methods. I have found that by relating the reaction field to the amount of light that is passed therethrough whereby it is possible to measure the change in the reaction field in terms of light intensity and recording the intensity change with a galvanometer or electro-recorder through a photo-electric converter, it is possible to determine the rate of reaction or kinetics in a degree of accuracy heretofore unobtainable.

The measure of reaction rates by the continuous observation of changes in molecular films has not previously been accomplished. The introduction of such a method would open up a wide field of information in the field of bio-chemical reactions, particularly those involving enzyme systems or antibody-antigen systems, and catalytic gas-surface reactions.

It is an object of this invention to develop a method and means for recording the reaction rates of chemical surface reactions.

A further object is to provide a means for recording the reaction rates of chemical surface reactions wherein the reaction is continuously recorded as it proceeds.

A still further object is to continuously record chemical reactions in a liquid or gaseous field as they proceed. These and other objects will be apparent as the description progresses. The specific process and technique described herein is for explanatory purposes and is not to be considered as defining the scope of the invention.

If light is projected on to a reflecting surface which is coated with a thin layer of transparent material, an interference phenomena occurs which is directly related to the coating thickness. Thus if ordinary light is reflected on to the surface, an interference occurs between one of the components of that part of the light reflected from the base surface and similar component of that part of the light reflected from the coated surface. This interference causes a change of intensity of the total reflected beam which varies with film thickness. This relationship is true when the angle of incidence, wave length of the light and refractive index of the film are kept constant. By measuring the change in intensity of the light component, the film thickness can be measured. This method is often referred to as the Langmuir-Blodgett technique. In actual practice, a monochromatic light is employed for the purpose of obtaining light of a constant wave length. In addition, an analyzer is inserted into the path of the reflected light, to remove therefrom the light component not interfered with, whereby the intensity change may be more pronounced.

When the base reflecting surface is metallic and the projected light has been plane-polarized at an azimuth other than 0° and 90°, prior to the projection thereof, the emergent light is elliptically polarized. The ellipticity of the reflected light depends upon the optical constants of the metal employed as the reflector, the refractive index of the film, the wave length and angle of incidence of the light, and the thickness of the material which covers the mirrored surface. When a film of transparent material is placed upon the reflecting surface the ratio of the major and minor axes of the ellipse and their position in space, commonly called the parameter of the ellipse, are functionally altered with the film thickness. This relationship exists for film thickness up to many thousand angstrom units and by measuring the parameter alteration, the film thickness can be determined. If a compensator (quarter wave length plate) is introduced into the path of the light beam, the elliptically polarized light can be reconverted into plane-polarized light and the azimuth thereof will be dependent upon the parameter of the ellipse. By employing monochromatic light as the beam the wave length thereof will be constant. Further, by passing the reflected plane-polarized light through an analyzer and rotating the same with reference to the compensator until the light passing through reaches a minimum intensity, the azimuth and thus the film thickness may be determined. An apparatus for doing this is termed an ellipsometer and is the basis of the Rothen method.

The use of the foregoing methods is successful in determining the changes in film thickness of various reactants. Thus it was possible by measuring the thickness of an absorbing film before it was placed in a reacting field and again after it was removed from the field to determine the amount of material absorbed thereon. This method has limitations however in that the measurements are periodic and not continuous. I have found that by passing the light through, i. e., the reaction interface, while the reaction is taking place, positioning a highly sensitive photo cell in the path of the reflected light to transpose the intensity into voltage potential and empirically relating the film thickness to a calibrated standard material under the same conditions, it is possible to continuously record the reaction and intimately study the rate thereof. Thus it is no longer necessary to remove the reflecting slide from the reaction solution to measure the change in film thickness. The photo cell is sensitive enough to measure changes in film thicknesses of the order of a few angström units and by employing an empirical calibration technique, the factors introduced by additionally passing the light through the reaction media are canceled as they are independent of the film material and the thickness thereof.

In employing this technique, it is important to observe that there are some limitations imposed thereon. The technique is successful if employed with a small number of superimposed monomolecular films only and the reaction media must be transparent, such as water for a liquid or air for a gas. Of course, the film to be studied must likewise be transparent, but no difficulty is encountered here, as all films are in the neighborhood of molecular thickness and are void of colloidal particles, the chief cause of opaqueness. In addition, the calibrating material, which also serves as a base material on which the film is deposited, must be transparent. I have employed barium stearate as my calibrating and base material, but it is to be understood that my method is not limited thereto. Many other organic and inorganic materials could be successfully employed such as metallic stearates, oleates, myristates, the calcium salts for example are satisfactory. Any long-chained fatty acid molecules which form rigid oriented monolayers can be successfully employed.

Referring now to the drawing, Fig. 1 is a horizontal sectional view of the apparatus employed in recording the reaction kinetics taken along the line 1—1 of Fig. 2.

Fig. 2 is a vertical sectional view taken along the line 2—2 of Fig. 1.

Figures 3, 4:
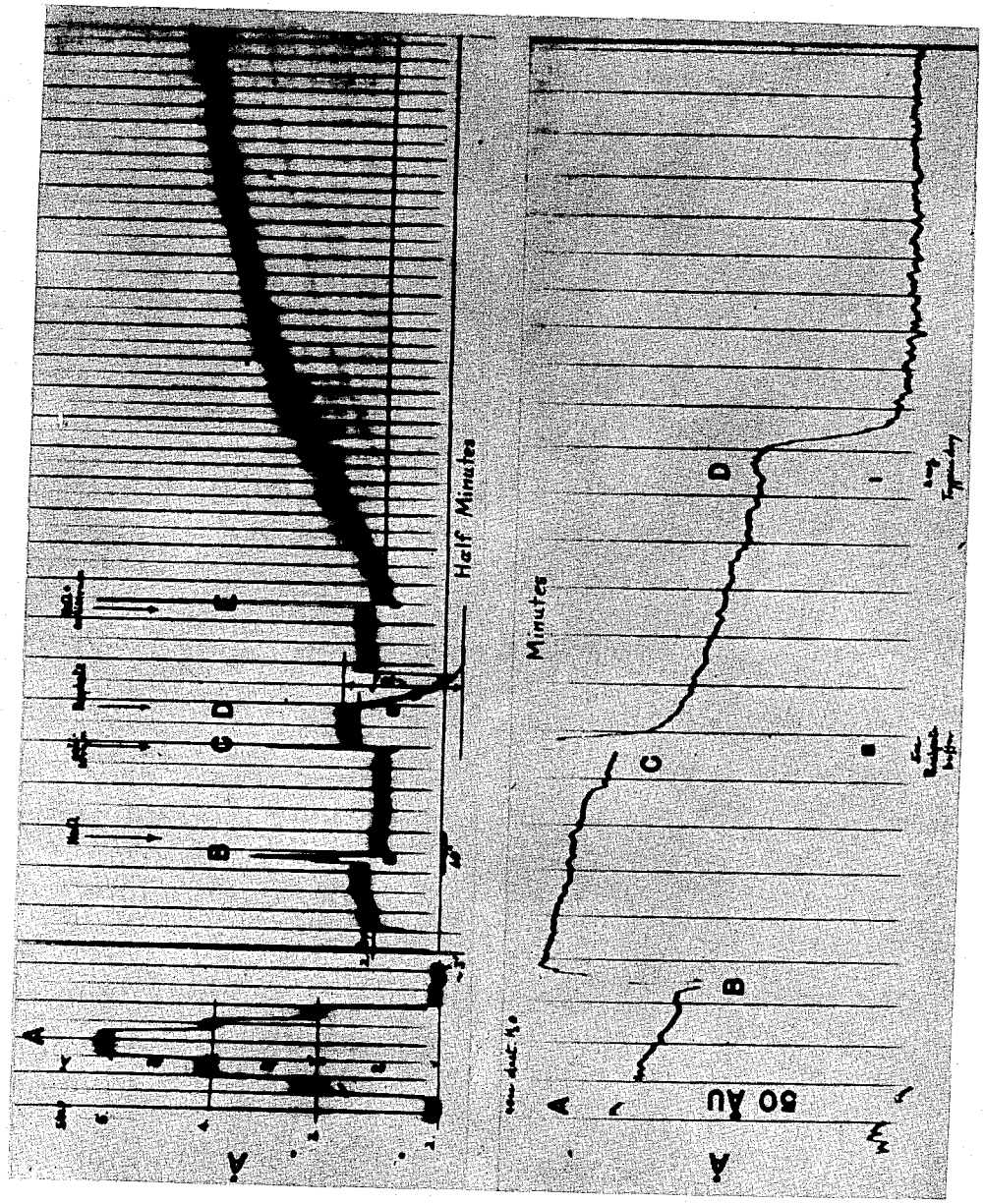
Fig. 3 is a graphic representation of the results obtained in Example I.
Fig. 4 is a graphic representation of the results obtained in Example II.

In describing my invention I have employed the principle of elliptical polarization and measured the parameter alteration. It is to be understood however that the description is for illustration purposes and I do not wish to limit the scope of my invention thereto.

In the drawing which employs a polarizer and a metallic reflecting plate and therefore reflects elliptically polarized light, 1 is glass lens positioned between the light source and entrance opening of the monochromator 2 so that it will focus the light at the said opening. The monochromator consists essentially of a rectangularly shaped box or housing having tubular shafts 3 and 4 positioned on perpendicularly opposed sides of the box and in a common plane. The shafts are open at their ends. A prism 5 is located within the box at the intersection point of axial projections from the shafts. In each of the shafts there is located a lens for rendering the diverging incoming light parallel and outgoing parallel light convergent. The prism is located on a rotatable bench and be revolving the bench, any particular light band may be selectively emitted at the end of shaft 4. The monochromatic light enters a third shaft 6 which is slitted. At the end of shaft 6, a polarizer 7 is located across the path of the beam travel which may be made of double refractory crystalline material, such as Nicol, etc. Rearward thereof is located a lens for rendering the divergent beam parallel. Located beyond the open end of shaft 6 is a rotatable and vertically movable table 8 with suitable locking means therefor and upon which a cuvette or reaction glass is placed. The reflecting plate is placed in the cuvette in such a manner that the light leaving shaft 6 passes through the fluid, is reflected off the film and metal surface and enters a fourth shaft 9. Shaft 9 is similar to shaft 6 being open at the end adjacent to table 8 and slitted at the opposite end. In the shaft 9 adjacent the open end thereof and intercepting the light passing therethrough, there is located a compensator 10 which converts the elliptically polarized light to plane-polarized light. The compensator is a thin disc of a double refracting crystal plate of crucial thickness protected by two glass discs; this unit is commonly known as the quarter-wave length plate. Beyond the plate and parallel thereto there is located an analyzer 11 which is nothing more than a disc of polarizing material. By rotating discs 10 and 11 until no light passes through the analyzer and employing this as a base whereby any change in thickness of film will produce light of increasing intensity, it is possible to get the maximum sensitivity possible as the calibrating curve, which is in the form of a sine wave is beginning at this point to move upward and each horizontal variation will record a maximum vertical change. It being understood of course that in so far as the invention is concerned that presetting the system for maximum sensitivity is not necessary. Beyond the analyzer there is located another lens to render the rays divergent. The combination of the shafts 6 and 9 with the associated polarizers and compensator together with the reflecting surface is popularly referred to as the ellipsometer. Located adjacent to the slitted end of shaft 9 is a photo-electric cell 12 of high sensitivity such as photo-multiplier cell. This cell is used to convert light intensity into electrical potential. The cell is attached to an amplifier 13 which in turn is attached to a recorder 14 for the well-known purpose of boosting the potential generated in the photo-electric cell whereby it will actuate the recorder.

The recorder may be any type of high speed galvanometer having a circular or rectilinear chart attached thereto or any other means for visual observance of voltage fluctuations.

In actual practice, light enters lens 1, is focused, refracted and the band desired is presented at the entrance of the ellipsometer, usually the yellow sodium band is employed unless it would interfere with the color of the reaction fluid. In the ellipsometer, the light is plane-polarized, reflected as elliptically polarized light, transposed into plane-polarized light, converted into electrical potential and the intensity thereof recorded.

The following examples will demonstrate the techniques employed and illustrate the effectiveness of the system.

*Example I*

A recording was made of the kinetics of the absorption of rabbit anti-bovine serum on an antigenic protein.

A mirror slide consisting of a glass plate chromium-plated on its front surface was coated with a base of barium stearate, each layer being offset from the adjacent one so that the slide gives the appearance of eight steps. The layers are applied in accordance with the Langmuir-mono-molecular technique, whereby each step has a layer of barium stearate two molecules thicker than the previous layer and since the thickness of a barium stearate molecule is 25 Å., the step increments are 50 Å. Over the entire base layer was placed a six molecule layer of bovine serum albumin as the antigenic protein, thus maintaining the 50 Å. step increments.

The plate was longitudinally placed into the ellipsometer cuvette which contained distilled water and thus by moving the cuvette up or down relative to the light beam, the selected step could be placed in the path of the beam. The vertical moving was accomplished by having the ellipsometer turntable mounted on a low pitch screw.

After placing the cuvette on the turntable, the recording paper was calibrated by exposing the photocell to the reflected light of one step (step 2). After zero stabilization of the photo-volt amplifier, three more steps were consecutively exposed to the reflected light and the procedure was reversed. Since the steps were 50 Å. the vertical steps on a film thickness time recording chart would represent 50 Å. calibrations. The chart was set to move at a convenient rate so that a clear picture could be obtained. The chart shown in Fig. 3 represents the calibration results of this sample; the abscissa indicates time in half minutes and the ordinate film thickness in Å. Thus in section A of the recording chart steps 2, 3, 4, and 5 were employed to calibrate the cell with a step wise return to step 2 on which the experiment took place. It will be noted that the starting point of the experiment is recorded above the calibrating position for the same step, this is due to adjusting the photo-volt amplifier to provide space below the starting level if needed; it does not affect the result.

With the cuvette in position on the turntable, and the stirrer set in motion, sodium chloride solution is added to bring the total concentration in the cuvette to 0.9%. The spike at B (Fig. 3) is due to the sudden inhomogeneity of the refractive index of the solution; it takes several seconds before the stirrer is able to homogenize the solution. The new level after B corresponds to the new refractive index.

After several minutes, 0.1 cc. of a high titer specific rabbit anti-bovine serum albumin-serum was added to the cuvette which yields an immediate small adsorption. This small increase after stirring gives a new level on the chart as seen at C due to the slight increase in film thickness. A minute later a small amount of phosphate buffer was added to the solution which removed part of the surface material, resulting in a drop below the reading level of the chart at D. The zero was again readjusted and after several minutes, more anti-serum was added and the reaction rate was recorded for over a quarter of an hour. This is shown to the right of E on the figure.

*Example II*

In this example, a recording was made of the kinetics involved in the hydrolysis of an antigenic protein by the enzyme trypsin.

A plate was prepared according to the method set forth in Example I above employing bovine serum albumin as the protein substrate.

The photo cell was exposed to the reflected light of two adjacent steps twice. This is indicated at A on Fig. 4 wherein the 50 Å. increments are much larger than in Fig. 3. In addition the time divisions represent one minute rather than a half minute. It will also be noted that exposing of the photo cell did not produce the same calibration for successive trials and there was a shorter ordinate for the second trial. This was due to the warming up of the amplifier. At B the zero was changed by adjusting the photo volt amplifier.

A small amount of phosphate buffer was added to the cuvette to remove some of the protein; this is indicated at C on Fig. 4 where, after homogenization, the curve went slowly downward; this was due to the decrease in film thickness and change in the refractive index of the solution. After six minutes the conditions had become constant. At this time, two milligrams of dry trypsin were added to the cuvette and within one minute the protein was hydrolized. This change was indicated on the chart at D where there was a sudden drop in the curve followed by an immediate and continuous stabilization.

From the foregoing description and examples, it will be seen that I have developed a method and apparatus combination to continuously record and study the kinetics of chemical surface reactions.

Having described my invention, I claim:

1. A method of continuously measuring the thickness of a transparent film which is subjected to a reactant in a reaction media which comprises building a step series of known molecular size increments of the film upon a reflecting surface, placing said surface in a transparent reaction media, separately exposing different steps to a beam of plane-polarized monochromatic light thereby producing reflected beams of light of different intensity, exposing a light intensity recorder to the reflected light beams thereby calibrating the said recorder, exposing one of the step layers of the film to the polarized light, adding the co-reactant to the reaction media and recording the intensity of the reflected light.

2. A method of continuously measuring the thickness of a transparent film which is subjected to a reactant in a reaction media which comprises, building a step series of molecular layers of a transparent base material upon a reflecting surface, superimposing a molecular size layer of the film upon the base material, placing the reflecting surface in a transparent reaction media, separately exposing different steps of the built up film to a beam of plane-polarized monochromatic light, thereby producing reflected beams of light of different intensity, exposing a light intensity recorder to the reflected light beams, thereby calibrating the said recorder, exposing one of the step layers of the film to the polarized light, adding the co-reactant to the reaction media and recording the intensity of the reflected light.

3. A method of continuously measuring the thickness of a transparent film which is subjected to a reactant in a reaction media which comprises building a step series of known molecular size increments of the film upon a metallic reflecting surface, placing said surface in a transparent reaction media, separately exposing different steps to a beam of plane-polarized monochromatic light thereby producing reflected beams of elliptically polarized light, converting the elliptically polarized light to a plane-polarized light of different intensities, exposing a light intensity recorder to the reflected light beams thereby calibrating the said recorder, exposing one of the step layers of the film to the polarized light, adding the co-reactant to the reaction media and recording the intensity of the reflected light.

4. A method of continuously measuring the thickness of a transparent film which is subjected to a reactant in a reaction media which comprises building a step series of known molecular size increments of the film upon a non-metallic reflecting surface, placing said surface in a transparent reaction media, separately exposing different steps to a beam of plane-polarized monochromatic light thereby producing reflected beams of plane-polarized light of different intensity, exposing a light intensity recorder to the reflected light beams thereby calibrating the said recorder, exposing one of the step layers of the film to the polarized light, adding the co-reactant to the reaction media and recording the intensity of the reflected light.

5. A method of continuously measuring the thickness of a transparent film which is subjected to a reactant in a reaction media which comprises building a step series of known molecular size increments of the film upon a metallic reflecting surface, placing said surface in a transparent reaction media, separately exposing different steps to a beam of plane-polarized monochromatic light thereby producing reflected beams of elliptically polarized light, passing the elliptically polarized light through a compensator thereby converting the elliptically polarized light to plane-polarized light of different intensities, passing the plane-polarized light through an analyzer which is oriented so that its azimuth is intermediate between the azimuth of the major and minor axes of the compensator whereby the different intensities of the plane-polarized light are more sharply defined, exposing a light intensity recorder to the reflected light beams thereby calibrating the said recorder, exposing one of the step layers of the film to the polarized light, adding the co-reactant to the reaction media and recording the intensity of the reflected light.

HANS J. TRURNIT.

References Cited in the file of this patent

UNITED STATES PATENTS

| Number | Name | Date |
|---|---|---|
| 2,425,399 | Sachtleben | Aug. 12, 1947 |

FOREIGN PATENTS

| Number | Country | Date |
|---|---|---|
| 722,746 | Germany | July 20, 1942 |